United States Patent Office 2,905,660
Patented Sept. 22, 1959

2,905,660

COPOLYMERIZATION OF CHLOROTRIFLUORO-ETHYLENE AND AN ALKYL VINYL ETHER

James J. Robertson, Akron, Ohio, assignor to The Firestone Tire & Rubber Company, Akron, Ohio, a corporation of Ohio No Drawing. Application March 2, 1954
Serial No. 413,726

4 Claims. (Cl. 260—87.5)

This invention relates to the copolymerization of chlorotrifluoroethylene and an alkyl vinyl ether to produce a stable latex.

Difficulty has been experienced in the inversion or production of prefloc in the production of emulsions of chlorotrifluoroethylene and an alkyl vinyl ether, and the occurrence of flocculation (coagulum) in storage of the emulsion. Emulsions which are stable are required for casting film, painting and spraying on fabrics, etc., and for dipping operations, as for the dipping of cloth gloves. The copolymer makes a protective coating resistant to red fuming nitric acid and other corrosive agents. The inability to produce stable emulsions free from floc for operations of the type mentioned has retarded their production and use.

By inversion and/or preflocculation is meant the formation of coagulum during the production of the copolymer. Further flocculation may occur on storage of the copolymer. The formation of this coagulum during the copolymerization interferes with the agitation and processing of the reaction mixture. Such inversion or preflocculation during the reaction or flocculation on subsequent standing reduces the solids content of the emulsion and thereby complicates its commercial use. Flocculation during storage produces an undesirable deposit in the container and loss of the valuable copolymer.

According to this invention the copolymerization is carried out in the presence of a free-radical-forming catalyst in an aqueous system in which both a water-in-oil emulsifier and an oil-in-water emulsifier are employed. The final emulsion is an oil-in-water emulsion. The improvement results in the elimination of the inversion and/or flocculation which occurs during the production of the latex, and prevents flocculation on storage.

In the production of the copolymer, equimolecular proportions of the alkyl vinyl ether and the monochlorotrifluoroethylene (hereinafter called CTFE) are copolymerized. In carrying out the reaction the ether content of the reaction mixture is not greater than one mol. for each mol. of CTFE, and the ratio of alkyl vinyl ether and CTFE is 0.1 to 0.9 mol. of the ether to each 0.9 to 0.1 mol. of CTFE. Alkyl vinyl ethers in which the alkyl group contains about 1 to 10 carbon atoms may be employed for the production of this copolymer. Thus, the copolymers may be produced from ethyl vinyl ether, i-propyl vinyl ether, t-butyl vinyl ether, n-hexyl vinyl ether, oxo-octyl vinyl ether (the term "oxo-octyl" will be used in this specification to designate the mixed alkyl radicals contained in the octyl alcohols produced by the "oxo" process), n-nonyl vinyl ether, etc.

The alkyl vinyl ethers do not homopolymerize in free-radical-catalyzed systems; and CTFE polymerizes only relatively slowly in such systems. The monomer pair of the present invention is unusual in that notwithstanding the individual reluctance of the respective monomers to polymerize, the two monomers copolymerize at an extremely rapid rate in a free-radical-catalyzed system. In order to effect such copolymerization the pH of the solution must be greater than 7. The reaction proceeds rapidly when the monomers are supplied to the system in approximately equimolecular proportions, say 0.4 to 0.6 mol. of alkyl vinyl ether for each 0.6 to 0.4 mol. to CTFE.

In order to decrease the tendency toward inversion and preflocculation, increment addition of the CTFE monomer to the alkyl vinyl ether reaction system has been found desirable. The resulting emulsion remains stable on storage.

A buffer is required in the free-radical-catalyzed system to maintain the required pH. Various buffers have been employed in such systems, such as, for example, sodium bicarbonate, ammonium acetate, di-sodium hydrogen phosphate and borax. Their use is well known in the art.

Although potassium persulfate, $K_2S_2O_8$, is a preferred catalyst and used generally in the following examples, the other recognized free-radical catalysts may be used, as for example, ammonium persulfate, hydrogen peroxide, etc.

Alkyl sulfonic acids and their alkali metal salts have heretofore been employed in free-radical-catalyzed copolymerization systems. Ordinarily the sodium salt has been used. Such a salt in which there is a mixture of alkyl groups of 12 to 14 carbon atoms is employed in carrying out this invention. If this is the only emulsifier employed in copolymerization of an alkyl vinyl ether and CTFE, inversion of the emulsion occurs when the reaction is about one-third completed. This is evidenced by the coagulation and precipitation of a relatively large mass of sticky copolymer, or the coagulation and precipitation of small button-like sticky masses of copolymer. This is sometimes termed preflocculation. An emulsion produced in this manner, from which such prefloc may be separated, will separate further floc on storage.

It has been found that if a water-in-oil emulsifier is used in addition to the alkyl sulfonic acid salt, there is substantial freedom from inversion and preflocculation. The water-in-oil emulsifier used is an alkylated aryl polyether alcohol having the general formula (I)

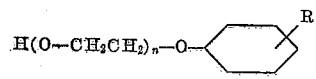

in which $n$ is 4 or 5 and R is an alkyl group having 6 to 10 carbon atoms as, for example, hexyl, oxo-octyl, decyl, etc. This ether alcohol is formed from ethylene oxide and an alkyl phenol such as isooctyl phenol or nonyl phenol, or more generally, a phenol to which there is attached an alkyl group of 6 to 10 carbon atoms. In producing the ether alcohol the ethylene oxide is reacted with the alkyl phenol in the ratio of about 4 or 5 mols. of the former to 1 mol. of the latter. It has been found that if the proportion of ethylene oxide is increased the emulsifier does not work as satisfactorily; and with high ratios of ethylene oxide to alkyl phenol, emulsifiers are obtained which are unsatisfactory.

The following examples are illustrative of the invention.

Example 1

The following ingredients were charged to a 2-gallon glass-lined vessel equipped with an anchor-type agitator designed to rotate at 400 r.p.m., after first sweeping the vessel with nitrogen:

| | Parts by weight |
|---|---|
| Distilled water | 67 |
| n-Butyl vinyl ether | 46.3 |
| CTFE | 53.7 |
| MP-635-S | 2.0 |
| Triton X-45 | 2.0 |
| Borax | 1.0 |
| $K_2S_2O_8$ | 0.5 |

MP-635-S is the sodium salt of $C_{12}$-$C_{14}$ sulfonic acid, manufactured by E. I. du Pont de Nemours & Company. Triton X-45 is an alkylated aryl polyether alcohol manufactured by Rohm & Haas Co. having the above general formula in which R is believed to be isooctyl.

The borax is used as a buffer to maintain a pH in excess of 7. The $K_2S_2O_8$ is used as a source of free radicals for catalyzing the reaction.

The reaction temperature was adjusted to 120 to 125° F. and held until the reaction was completed. There was little evidence of inversion or preflocculation of the emulsion. On storage of the emulsion there was no objectionable flocculation.

Example 2

The foregoing example was repeated except that the CTFE was added incrementally. On adding the CTFE in three equal portions, an emulsion was obtained which was free from all prefloc. No advantage was found in using more than three increments.

Example 3

The following ingredients were charged to a 2-gallon glass-lined vessel equipped as in Example 1:

| | Parts by weight |
|---|---|
| Distilled water | 100 |
| 2-ethylhexyl vinyl ether | 57 |
| CTFE | 43 |
| MP-635-S | 2 |
| Triton X-45 | 2 |
| Borax | 1 |
| $K_2S_2O_8$ | 0.5 |

The CTFE was added in three increments. The temperature of the reaction mixture was maintained at 120 to 125° F.

The emulsion was free from all prefloc, and no appreciable floc was formed on storage. Similar reactions employing 2-ethylhexyl vinyl ether, with and without increment addition, and other reactions with a single emulsifier and CTFE monomer added in increments, consistently gave inversion and/or flocculation in such large quantity as to interfere with the operation of the agitator in the vessel. After each copolymerization it was necessary to take the reactor apart, and large sticky masses of prefloc were removed from the walls of the vessel and the agitator shaft before reuse. The improvement was most noticeable with the 2-ethylhexyl vinyl ether copolymerization because of the great difficulty encountered with inversion and preflocculation by following the teachings of the prior art.

Example 4

The following ingredients were charged to a glass bottle and it was placed in a rotary polymerizer which was maintained at 122° F.:

| | Parts by weight |
|---|---|
| Distilled water | 100 |
| n-Butyl vinyl ether | 46.3 |
| CTFE | 53.7 |
| MP-635-S | 2.0 |
| Antarox A-401 | 2.0 |
| Borax | 1.0 |
| $K_2S_2O_8$ | 0.5 |

Antarox A-401, manufactured by General Aniline and Film Corp., is an alkylated aryl polyether alcohol of the above Formula I in which R is nonyl. The emulsion was essentially free from all prefloc and no objectionable flocculation occurred on standing.

Example 5

Example 4 was repeated, except that the CTFE was added in three increments. The resulting emulsion was free from all prefloc, and no floc was formed on storage.

Examples 6 and 7

Example 4 was repeated, using a mol. of 2-ethylhexyl vinyl ether for each mol. of CTFE. In one example the CTFE was added in increments and in another example all of the CTFE was introduced at the beginning of the reaction. Without increment addition there was but little prefloc, and with increment addition, there was no prefloc, and no floc formed on storage.

Other alkyl vinyl ethers which have been used in the reaction include isooctyl vinyl ether, nonyl vinyl ether, tridecyl vinyl ether, methyl vinyl ether, ethyl vinyl ether, etc.

Extensive experiments were conducted using different emulsifiers in combination with the salt of an alkyl sulfonic acid. The following tended to improve the stability of the emulsion although the results were inferior to those obtained with the emulsifier previously described: Triton 9X-102 (Rohm and Haas), Triton X-100 (Rohm and Haas), S-1195 (Glyco Products), aliphatic ester sulfate (Onyx Oil and Chemical Co.), Ethomid C/60 (Armour & Co.), Non-ionic No. 4 (Sharples), Non-ionic No. 200 (Sharples), and Non-ionic No. 6 (Sharples).

The examples are illustrative, and the invention is set forth in the claims which follow.

What I claim is:

1. The process of copolymerizing chlorotrifluoroethylene and an alkyl vinyl ether in which the alkyl group contains 1 to 10 carbon atoms, in an aqueous system with the production of a stable latex, which process comprises copolymerizing equal molecular proportions of said monomers in the presence of a free-radical-forming catalyst, employing as emulsifiers (1) an alkali metal salt of an alkyl sulfonic acid the alkyl group of which contains 12 to 14 carbon atoms and (2) an alkylated aryl polyether alcohol in the ratio of 1 to 3 parts by weight of one of the emulsifiers to 3 parts by weight of the other emulsifier, the reaction mixture being buffered to a pH greater than 7, and the alkylated aryl polyether alcohol having the formula

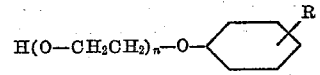

in which $n$ is 4 to 5 and R is an alkyl group of 6 to 10 carbon atoms.

2. The process of claim 1 in which a butyl vinyl ether is used in producing the copolymer.

3. The process of claim 1 in which an octyl vinyl ether is used in producing the copolymer.

4. The process of claim 1 in which the chlorotrifluoroethylene is added in increments during the progress of the process.

References Cited in the file of this patent

UNITED STATES PATENTS

| 2,479,367 | Joyce et al. | Aug. 16, 1949 |
| 2,562,118 | Osdal | July 24, 1951 |
| 2,779,025 | Perry | Jan. 29, 1957 |